(12) United States Patent
Giovannini et al.

(10) Patent No.: US 8,781,654 B2
(45) Date of Patent: Jul. 15, 2014

(54) METHOD AND DEVICE FOR AIDING THE APPROACH OF AN AIRCRAFT DURING AN APPROACH PHASE FOR THE PURPOSE OF LANDING

(75) Inventors: Andrea Giovannini, Toulouse (FR); Thomas Pastre, Caluire et Cuire (FR)

(73) Assignee: Airbus Operations (SAS), Toulouse Cedex (FR)

( * ) Notice: Subject to any disclaimer, the term of this patent is extended or adjusted under 35 U.S.C. 154(b) by 338 days.

(21) Appl. No.: 13/309,697

(22) Filed: Dec. 2, 2011

(65) Prior Publication Data

US 2012/0150369 A1 Jun. 14, 2012

(30) Foreign Application Priority Data

Dec. 8, 2010 (FR) ...................................... 10 60243

(51) Int. Cl.

| G06F 19/00 | (2011.01) |
|---|---|
| G06G 7/70 | (2006.01) |
| G05D 1/00 | (2006.01) |
| G05D 3/00 | (2006.01) |
| G06F 7/00 | (2006.01) |
| G06F 17/00 | (2006.01) |
| G08G 5/02 | (2006.01) |
| G08G 5/00 | (2006.01) |

(52) U.S. Cl.
CPC .............. G08G 5/025 (2013.01); G08G 5/0021 (2013.01)
USPC .............. 701/18; 701/1; 701/3; 701/4; 701/5; 701/6; 701/10; 701/11; 701/16; 701/17

(58) Field of Classification Search
USPC ...................... 701/1, 3–11, 14, 15, 16, 17, 18
See application file for complete search history.

(56) References Cited

U.S. PATENT DOCUMENTS

| 5,739,770 | A | * | 4/1998 | Liden ............................ 340/976 |
| 5,957,412 | A | * | 9/1999 | Saint Upery et al. .......... 244/180 |
| 6,216,065 | B1 | * | 4/2001 | Hall et al. ....................... 701/16 |
| 8,494,761 | B2 | * | 7/2013 | Giovannini et al. ........... 701/301 |
| 2001/0052562 | A1 | * | 12/2001 | Ishihara et al. ................ 244/175 |
| 2002/0040263 | A1 | * | 4/2002 | Johnson et al. .................. 701/17 |

(Continued)

FOREIGN PATENT DOCUMENTS

| EP | 1352315 | 2/2009 |
| FR | 2872316 | 12/2005 |

(Continued)

OTHER PUBLICATIONS

French Patent Office, French Search Report FR 1060243, Jul. 9, 2011 (2 pgs).

*Primary Examiner* — Bhavesh V Amin
(74) *Attorney, Agent, or Firm* — Wood, Herron & Evans, LLP

(57) ABSTRACT

The device includes elements of a processing unit which determine a limit trajectory representing a flight trajectory which is compatible with the aircraft performance during the approach and which shows the limits for the flight of the aircraft. For example, a vertical profile and a horizontal trajectory are determined, with the horizontal trajectory being non-linear so that the energy of the aircraft can be sufficiently dissipated before final approach along an approach axis, while also avoiding obstacles. Thus, a flight trajectory is determined even when the aircraft has deviated from a flight plan and approach axis.

15 Claims, 4 Drawing Sheets

(56) References Cited

U.S. PATENT DOCUMENTS

| | | | |
|---|---|---|---|
| 2006/0200279 A1* | 9/2006 | Ainsworth et al. | 701/16 |
| 2007/0129857 A1* | 6/2007 | Fortier | 701/16 |
| 2007/0225876 A1 | 9/2007 | Caillaud et al. | |
| 2008/0262665 A1* | 10/2008 | Coulmeau et al. | 701/16 |

FOREIGN PATENT DOCUMENTS

| | | |
|---|---|---|
| FR | 2893443 | 5/2007 |
| FR | 2915304 | 10/2008 |
| WO | 2006120318 | 11/2006 |

* cited by examiner

METHOD AND DEVICE FOR AIDING THE APPROACH OF AN AIRCRAFT DURING AN APPROACH PHASE FOR THE PURPOSE OF LANDING

TECHNICAL FIELD

The present invention relates to a method and a device for aiding the approach phase of an aircraft, in particular of a transport airplane, upon an approach for a landing on a landing runway of an airport.

More particularly, the present invention aims at determining and at displaying a limit trajectory compatible with the performance of the aircraft when the crew has selected the landing runway. The operational context, for which this invention is particularly adapted, is a common radar guidance by the air traffic control. However, the present invention could also be used for aiding pilots in any situation, wherein the approach phase of the runway does not occur according to a predetermined trajectory.

BACKGROUND

As known, commercial aircrafts and from now on a lot of aircrafts belonging to the general aviation, are provided with on-board avionics systems allowing to define and memorize a full flight plan as well as to calculate the current position of the aircraft and to guide it according to a programmed trajectory. The latter is generally previously discussed with the authorities in charge of managing the air traffic.

As long as the aircraft follows the programmed trajectory, the avionics system has available all the information needed for managing the evolution of the speed vector of the aircraft, including in this process optimization objectives, possible constraints on the trajectory and the respect of the aircraft performance. On the other hand, when the aircraft deviates from the original flight plan, the on-board systems do not have available all the information needed for predicting and fully managing the evolution of the future trajectory. The latter could be the result of a sequence of instructions from the air traffic control, and most often of a discussion between the pilots and the ground control in the case of a radar guidance, or it could be completely managed by the pilots, for instance upon a sight approach phase. Whatever the situation being considered, humans actors should therefore each time determine, evaluate and implement the trajectory.

The present invention aims at solving these drawbacks and at aiding pilots during the approach phase.

A common radar guidance by the air traffic control is a relatively simple approach method for the pilots. On the other hand, when the external situation becomes complicated, for instance because of bad weather conditions or a very large number of airplanes converging to the runway, it could happen that the interception heading of the approach axis proposed by the air traffic control, or a delayed descent authorization, results in the aircraft following a trajectory that does not allow to dissipate all the energy. There is then a risk of over-speed, or in general of the usual conditions referred to as "stabilized approach" not being met.

The same risks could occur when pilots are authorized to carry out a sight approach phase. In such a situation, tiredness, operational pressure, lack of reference points on the ground (for instance upon a night approach phase on the sea) and/or lack of training are all factors able to result in a bad evaluation of the trajectory to be followed.

The present invention aims at solving these drawbacks. It relates to a method for aiding the crew of an aircraft, in particular of a transport airplane, upon an approach phase for the purpose of landing on a landing runway of an airport.

SUMMARY OF THE INVENTION

According to this invention, said method is remarkable in that, automatically and repeatedly:

(A) a limit trajectory is built representing a flight trajectory of the aircraft being compatible with the performance of said aircraft upon the approach and which shows the limits where the aircraft can move around, implementing the following operations consisting in:
  (a) receiving the current speed vector and the current position of the aircraft and position data relative to the landing runway and to a stabilization point;
  (b) determining as a function of the performance of the aircraft, of its current speed vector and of its current position, a vertical profile which shows the variation of the height and of the speed of the aircraft as a function of a distance and being such that it allows to dissipate the energy of the aircraft upon the approach;
  (c) determining a horizontal trajectory, allowing the aircraft to reach the stabilization point, respecting the vertical profile determined at step (b); and
  (d) if applicable, determining the position of a limit point on this horizontal trajectory, corresponding to the engagement at the latest of the approach phase according to the limit trajectory; and
(B) the limit trajectory is automatically presented comprising said horizontal trajectory and, if applicable, said limit point, on a viewing screen in the cockpit of the aircraft.

Thus, thanks to the invention, a limit trajectory is determined, and automatically shown, representing a flight trajectory of the aircraft, being compatible with the performance of the latter upon the approach and which shows borders within which the aircraft can move around.

The method according to this invention allows to aid pilots not to exceed the limits defined by the performance of the aircraft, while leaving the pilots free to react on the trajectory for meeting the objectives of passenger comfort, of keeping the visual contact with the runway, and/or of avoiding clouds for instance.

In the case of a usual radar guidance managed by the air traffic control, the interest of such aid is that it is able to provide some support to the pilots with respect to the management of the trajectory and, more particularly, to the negotiation with the ground controllers. Displaying the limit trajectory allows to rapidly evaluate the compatibility between the instructions received from the controllers and the actual performance of the aircraft.

Furthermore, advantageously, at step (b), a vertical profile is determined linking the current energy state of the aircraft to the energy state required at the stabilization point.

Furthermore, advantageously, said vertical profile is determined according to one of a plurality of different building criteria, one of which is selected by default and the others can be selected by an operator. Preferably, to this end, one of the following building criteria is used:
  one building criterion, wherein the stabilization point is directly linked to the current altitude;
  one building criterion, wherein a constant altitude level is provided at the stabilization point; and
  one building criterion, wherein a constant altitude level is provided between the stabilization point and the current point.

Furthermore, advantageously, at step (A), a prediction is carried out for the current speed vector of the aircraft.

Moreover, advantageously, at step (c), the horizontal trajectory is determined according to one of a plurality of different building rules, one of which is selected by default and the others could be selected by an operator. Preferably, to this end, one of the following building rules is used:
- one building rule, whereby an immediate turn is carried out;
- one building rule, whereby the current heading is held as long as possible; and
- one building rule, whereby the current heading is held until the approach axis.

Furthermore, advantageously, at step (A), on the horizontal trajectory, the position of an auxiliary limit point is determined, corresponding to a point before which (that is upstream of which) it is not recommended to subject the aircraft to a turn.

The present invention also relates to a device for aiding the crew of an aircraft, in particular of a transport airplane, upon an approach phase for the purpose of landing on a landing runway of an airport.

According to this invention, said device is remarkable in that it comprises:
- a processing unit for automatically building a limit trajectory representing a flight trajectory of the aircraft being compatible with the performance of said aircraft upon the approach and which shows limits within which the aircraft can move around, said processing unit comprising:
  - means for receiving the current speed vector of the aircraft and position data, relative to the landing runway and to a stabilization point;
  - means for determining, as a function of performance of the aircraft and of its current speed vector, a vertical profile which shows the variation of the height and of the speed of the aircraft as a function of a distance and being such that it allows to dissipate the energy of the aircraft (A) upon the approach;
  - means for determining a horizontal trajectory allowing the aircraft to reach the stabilization point, while respecting said vertical profile; and
  - means for determining, if applicable, the position of a limit point on this horizontal trajectory, corresponding to the engagement at the latest of the approach phase according to the limit trajectory; and
- displaying means for automatically show the limit trajectory comprising said horizontal trajectory and if applicable said limit point, on a viewing screen in the cockpit of the aircraft.

The device according to this invention thus determines, taking into consideration the current state of the aircraft, of its performances and of the final objective, a limit trajectory compared to said performance. Displaying this limit trajectory shows the pilot(s) the border of the space where the aircraft can move around, while holding at the same time a piloting modality (either manual or by means of the autopilot) being compatible with the requirements of a short term management and of the role of the human element (on board and on the ground) imposed by the situations being considered.

In a particular embodiment, said device could comprise:
- means allowing the pilot to manually activate the display of the limit trajectory on said viewing screen; and/or
- means for automatically activating the display of said limit trajectory, for instance as soon as the aircraft deviates from its flight plan upon an approach phase.

The present invention further relates to an aircraft, in particular a transport airplane, being provided with an aiding device such as mentioned hereinabove.

BRIEF DESCRIPTION OF THE DRAWINGS

The FIGS. of the appended drawings will better explain how this invention can be implemented. In these FIGS., like reference numerals relate to like components.

DETAILED DESCRIPTION

Figure 1:
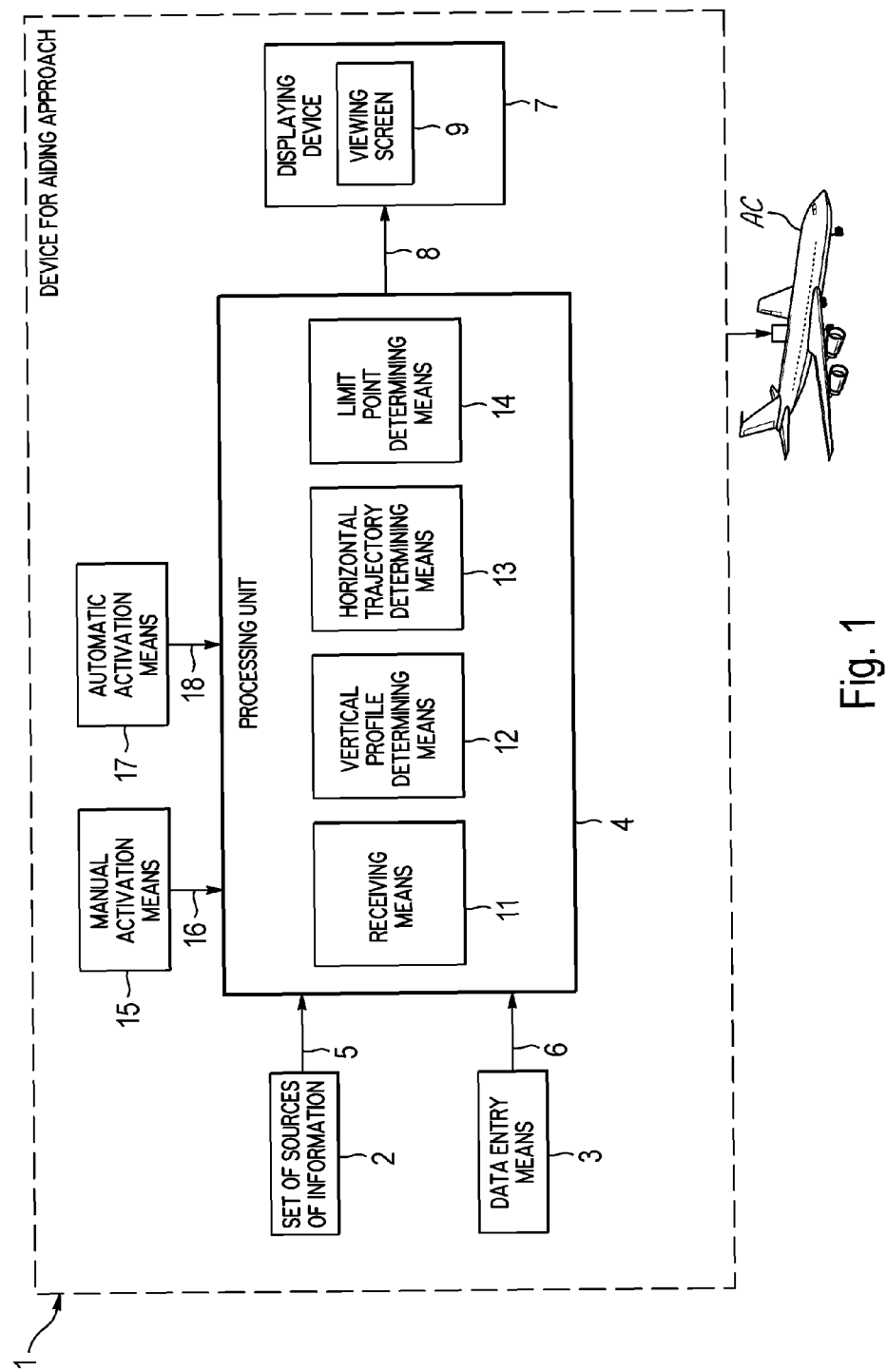
FIG. 1 is a block diagram of a device according to the invention.

The device 1 according to this invention and schematically shown on FIG. 1, aims at aiding the crew of an aircraft A, in particular a transport airplane, upon an approach phase for the purpose of landing on a landing runway 20 of an airport.

According to this invention, said device 1 comprises:
set of sources of information 2;
data entry means 3 allowing an operator to enter data in the device 1;
a processing unit 4 being connected via links 5 and 6 respectively to said set of sources of information 2 and to the data entry means 3 and being formed so as to automatically build a limit trajectory TL representing a flight trajectory of the aircraft A being compatible with the performance of said aircraft A upon the approach and which shows the limits in which the aircraft A can move around; and
a displaying device 7 being connected via a link 8 to the processing unit 4 and being formed so as to automatically present the limit trajectory TL (comprising a horizontal trajectory TH defined in the horizontal plane and set forth below), as well as, if applicable, a limit point to be described hereinafter, on a viewing screen 9 in the cockpit of the aircraft, for instance a navigation screen of the Navigation Display ("ND") type.

Moreover, said processing unit 4 comprises:
receiving means 11 for receiving the current speed vector of the aircraft A and position data, relative to the landing runway 20 and to a stabilization point S, in particular from the set of sources of information 2 of sources of information;
vertical profile determining means 12 for determining, as a function of performance of the aircraft A and of the current speed vector, a vertical profile PV which shows the variation of the height and of the speed of the aircraft A as a function of a distance and being such that it allows to dissipate the energy of the aircraft A upon the approach;
horizontal trajectory determining means 13 for determining a horizontal trajectory TH allowing the aircraft A to reach the stabilization point S, respecting said vertical profile PV; and
limit point determining means 14 for determining, if applicable, the position of a limit point on this horizontal trajectory TH, corresponding to the engagement at the latest of the approach phase according to the limit trajectory TL.

Thus, the device 1 according to the invention determines and shows automatically a limit trajectory TL representing a flight trajectory of the aircraft A being compatible with the performance of the latter upon the approach and which shows the limits for the flight of the aircraft A.

Said device 1 allows to aid pilots not to exceed the limits defined by the performance of the aircraft A, while leaving the pilots free to react on the trajectory for meeting the objectives of passengers' comfort, of keeping the visual contact with the runway, and/or of avoiding clouds for instance.

In the case of a usual radar guidance managed by the air traffic control, this aid is advantageous in that it is able to provide some support to pilots with respect to the management of the trajectory and, more particularly, to the negotiation with the ground controllers. Displaying the limit trajectory TL allows to rapidly evaluate the compatibility between the instructions received from the controllers and the actual performance of the aircraft A.

In a particular embodiment, the device 1 further comprises:
manual activation means 15 being connected via a link 16, for instance, to the processing unit 4 and allowing the pilot to manually activate the display of the limit trajectory TL on said viewing screen 9; and/or
automatic activation means 17 being connected via a link 18, for instance also to the processing unit 4 and automatically activating the display of said limit trajectory TL when particular conditions are met, in particular as soon as the aircraft deviates from its flight plan upon an approach phase.

This limit trajectory TL being shown to the pilot indicates the most constraining meeting potential trajectory (that is the shortest one) compared to the performance of the aircraft A. Its display (for instance on a navigation screen) can thus be activated on request of the pilot either via manual activation means 15 (for instance a dedicated man/machine interface), or by default, for instance as soon as the aircraft A leaves the reference flight plane upon an approach phase.

The present invention relies on the definition of a target point on the approach axis 22 (as a function of the current need), being entered for instance using data entry means 3, on the knowledge of the current speed vector followed by the aircraft A (or of a short term prediction of said speed vector), received from the set of sources of information 2, and on the definition of a number of building rules of the trajectory, taking into consideration:
the relative position between the aircraft A and the approach axis 22;
a maximum number of heading changes to be contemplated; and
the definition of the first turn toward the approach axis 22 (immediate turn or delayed turn).

These elements are then transferred to the processing unit 4 generating the optimized trajectory TL, integrating a prediction of the vertical profile PV linking the current energy state of the aircraft A to that required above the threshold 24 of the runway 20.

The limit point determining means 14 could also determine the position of an auxiliary limit point, to be described below, before which the pilot is not recommended to subject the aircraft A to a turn. The device 1 more specifically allows, via the display of this trajectory, to represent to the pilot constraints of energy type. In the case where the aircraft A is taken on a vector excessively converging to the runway 20, the trajectory produced by the processing unit 4 will allow to dissipate the excess energy. The vision of the resulting trajectory allows the pilot to directly identify the problem associated with the dissipation.

Figure 2:
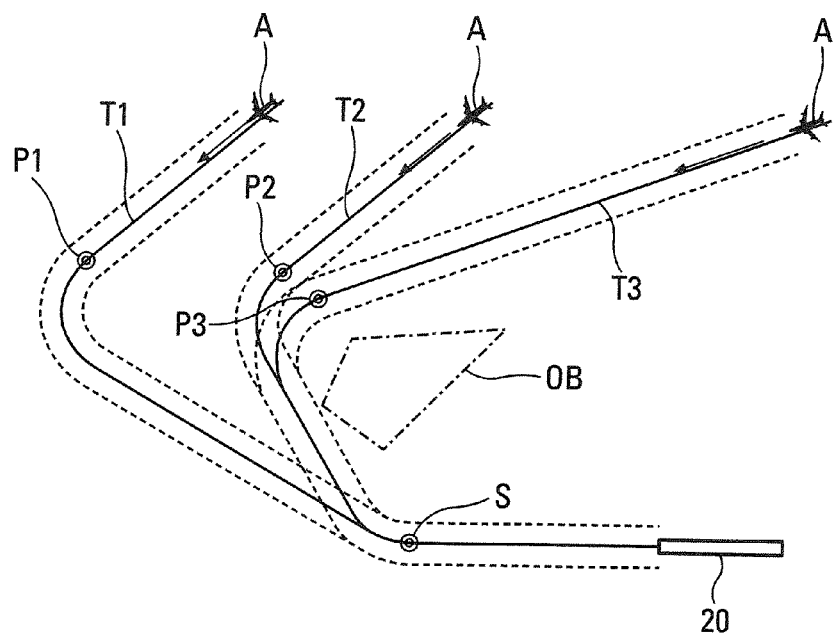
FIG. 2 is a diagram showing a plurality of flight trajectories constructed using the method of the current invention.

FIG. 2 shows three different cases, corresponding to three different positions of the aircraft A. In each case, the trajectory T1, T2 and T3 between the current position of the aircraft A and a target point Si (in particular said stabilization point S) is the shortest flying trajectory, taking into consideration the necessary distance for dissipating the total energy and the presence of an obstacle OB to be bypassed. As shown in FIG. 2, these parameters result in each trajectory T1, T2 and T3 being non-linear to the stabilization point S. The latter influences more specifically the trajectories T2 and T3. On this FIG. 2, the points of limit bend P1, P2 and P3 on the trajectories T1, T2 and T3 are also shown. The trajectories T1, T2 and T3 could be formed, as an illustration, through the method described in patent application FR-10 60191.

As soon as the device 1 is activated, the processing unit 4 recovers with the help of the set of sources of information 2:
- the speed vector of the aircraft A; and
- the position data relative to the runway 20 and to the stabilization point S.

These elements are received by the receiving means 11 and transmitted to the vertical profile determining means 12 usually generating the vertical profile PV (described in terms of distance, height and speed) being required for dissipating the energy, so as to generate the limit profile compared to the performance of the aircraft A (for instance airbrakes being implemented, minimization of the total distance DT followed on the ground, . . . ).

The vertical profile determining means 12 thus determine a vertical profile PV linking the current energy state of the aircraft A to the energy state required at the stabilization point S (or at a point 24 linked to the runway 20 and described below). Furthermore, the vertical profile determining means 12 determine said vertical profile PV according to one of a plurality of different building criteria, one of which is selected by default and the others could be selected by an operator (using data entry means 3).

Figure 3A:
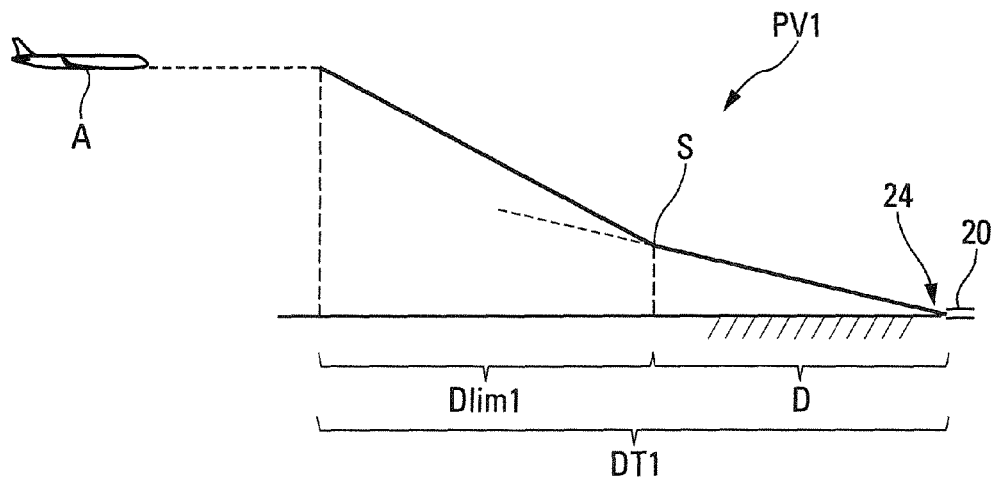
FIG. 3A is a diagram showing a first embodiment for building a vertical profile according to this invention, by using a first building criterion where the stabilization point is directly linked to the current altitude.
Figure 3B:
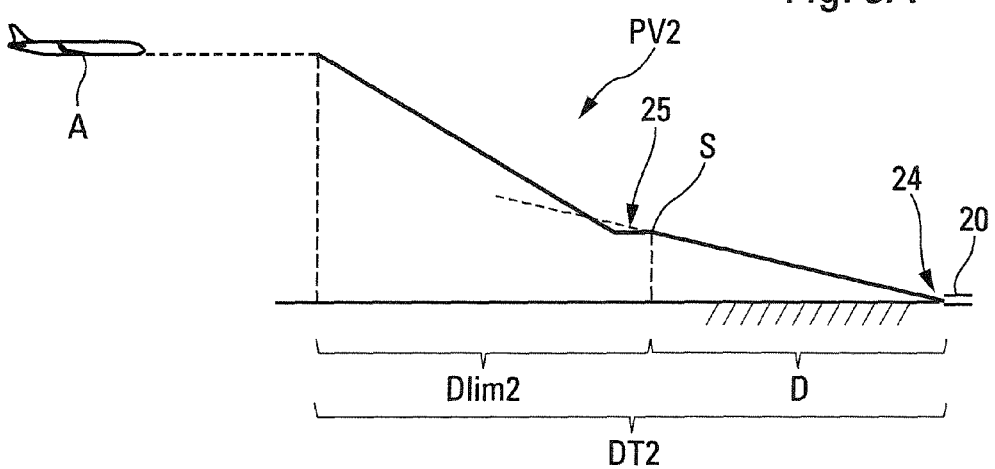
FIG. 3B is a diagram showing a second embodiment for building a vertical profile according to this invention, by using a second building criterion where a small level at constant altitude is inserted just upstream of the stabilization point.
Figure 3C:
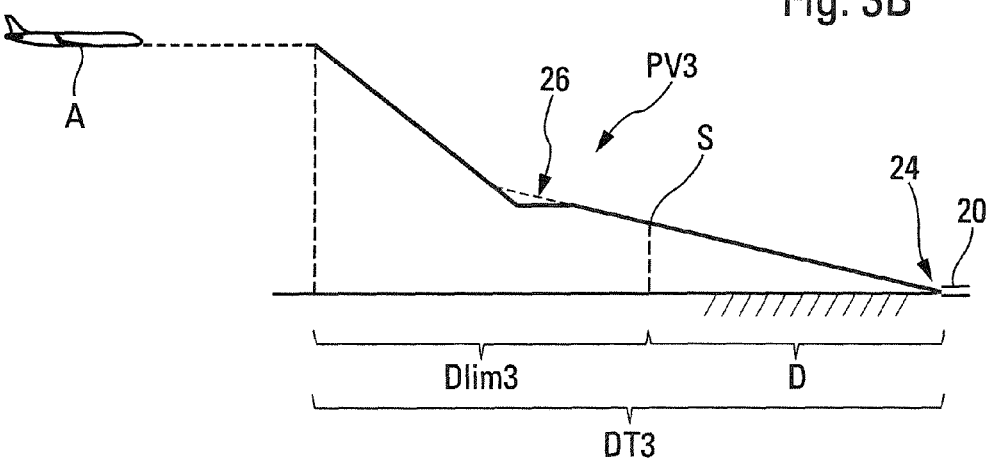
FIG. 3C is a diagram showing a third embodiment for building a vertical profile according to this invention, by using a third building criterion where a small level at constant altitude is inserted at some point between the stabilization point and the current altitude.

Preferably, the vertical profile determining means 12 use, to this end, one of the following building criteria:
- one first building criterion, wherein the stabilization point S is directly linked to the current altitude, as shown on FIG. 3A;
- one second building criterion, wherein a small level 25 at constant altitude, just upstream of the stabilization point S, as shown on FIG. 3B; and
- one third building criterion, wherein a small level 26 at constant altitude between the stabilization point S and the current altitude, as shown on FIG. 3C.

The first part (length D on the ground) of the vertical profile PV (going up from the runway 20 to the aircraft A) remains on the approach axis 22 between the stabilization point S and the point 24 at 50 feet on the threshold of the runway 20. For this reason, the slope is fixed for this part.

Building the second part of the vertical profile PV could occur according to the above mentioned building criteria. Thus:
- the simplest way involves directly reaching the height and the current energy state of the aircraft A, so as to form the vertical profile PV1 shown on FIG. 3A (length Dlim1 on the ground for this second part);
- a second solution therefore provides a small part 25 in level (or at a reduced slope) before the stabilization point S so as to avoid intercepting the final approach axis from the top, so as to form the vertical profile PV2 shown on FIG. 3B (length Dlim2 on the ground); and
- a third solution, for forming the vertical profile PV3 shown on FIG. 3C (length Dlim3 on the ground), takes into consideration the case where the aircraft A intercepts the approach axis 22 before the stabilization point S. Preferably, the intersection point of the level with the approach axis (in the vertical plane) and the point where the trajectory of the aircraft A reaches the approach axis (in the horizontal plane) when the aircraft A meets it before the stabilization point S, are matched. This supposes a calculation thru iterations for determining the distance Dlim3 as a function of the energy to be dissipated, since the distance between the end of the level 26 and the point S is not predetermined.

Furthermore, the horizontal trajectory determining means 13 determine a horizontal trajectory TH allowing the aircraft A to reach the stabilization point S, respecting the vertical profile PV determined by the vertical profile determining means 12, that is allowing a dissipation of the energy from the aircraft A.

Furthermore, said horizontal trajectory determining means 13 determine this horizontal trajectory TH by implementing one of a plurality of different building rules, one of which is selected by default and the others could be selected by an operator (using data entry means 3). Preferably, the horizontal trajectory determining means 13 use, to this end, one of the following building rules:
- one building rule, whereby an immediate turn is implemented, as shown on FIGS. 4A and 5A;
- one building rule, whereby the current heading (trajectory 27A, 27B) is held as long as possible, as shown on FIGS. 4B and 5B; and
- one building rule, whereby the current heading (trajectory 27A, 27B) is held up to the approach axis 22, as shown on FIGS. 4C and 5C.

Figure 4A:
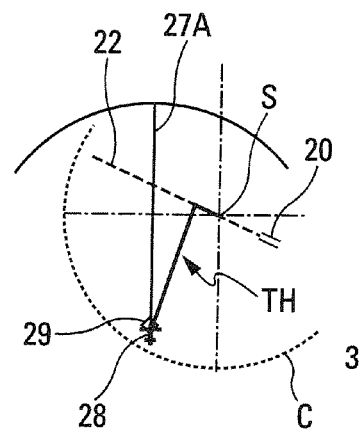
FIG. 4A is a diagram showing a first embodiment for building a horizontal trajectory using a first building rule where a turn is immediately implemented.
Figure 4B:
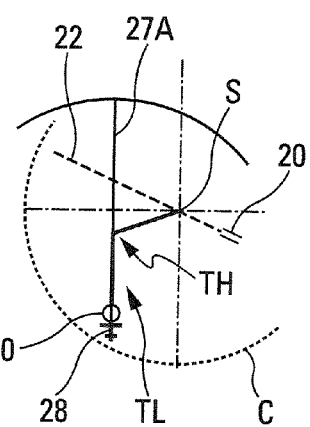
FIG. 4B is a diagram showing a second embodiment for building a horizontal trajectory using a second building rule where the current heading is held as long as possible.
Figure 4C:
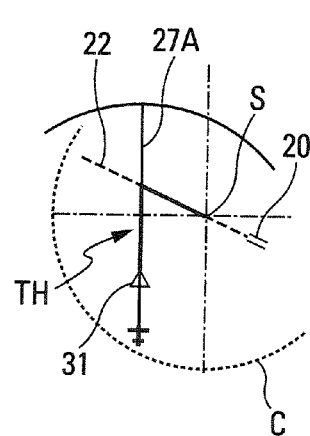
FIG. 4C is a diagram showing a third embodiment for building a horizontal trajectory using a third building rule where the current heading is held up until the approach axis.
Figure 5A:
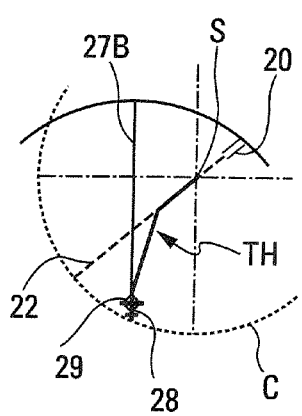
FIG. 5A is a diagram showing a first embodiment for building a horizontal trajectory using a first building rule where a turn is immediately implemented, with the initial heading of the aircraft being distinct from that shown in FIG. 4A for comparison purposes.
Figure 5B:
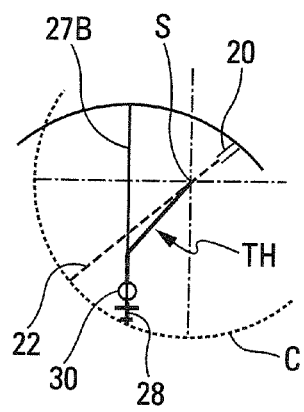
FIG. 5B is a diagram showing a second embodiment for building a horizontal trajectory using a second building rule where the current heading is held as long as possible, with the initial heading of the aircraft being distinct from that shown in FIG. 4B for comparison purposes.
Figure 5C:
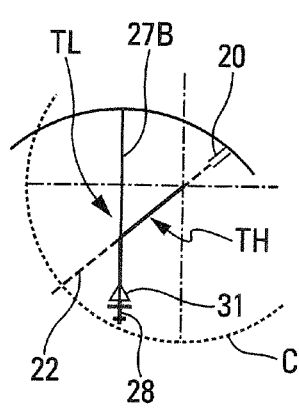
FIG. 5C is a diagram showing a third embodiment for building a horizontal trajectory using a third building rule where the current heading is held up until the approach axis, with the initial heading of the aircraft being distinct from that shown in FIG. 4C for comparison purposes.

FIGS. 4A to 4C differ from FIGS. 5A to 5C, by a different relative position between the approach axis 22 and the current trajectory 27A, 27B followed by the aircraft A (according to the current heading), the current position of said aircraft A being represented by a symbol 28.

The horizontal trajectory determining means 13 determine afterwards the position of a first limit point on this trajectory TH, corresponding to the engagement at the latest of the approach phase on said trajectory. This position is illustrated:
- by a symbol 29 shown in the shape of a lozenge in the example of FIGS. 4A and 5A;
- by a symbol 30 shown in the shape of a circle in the example of FIGS. 4B and 5B; and
- by a symbol 31 shown in the shape of a triangle in the example of FIGS. 4C and 5C.

The previous FIGS. thus show three different ways to spread the distance Dlim on a trajectory linking the aircraft A to the selected target point S, as a function of the type of trajectory. The length of the thick continuous lines illustrating the trajectory TH (between S and the limit point) is always equal to Dlim (corresponding to the radius of the circle C with a center S, being partially shown, in dashed lines, on these FIGS.).

Two additional display modalities could be mentioned:
- the display of the circle C being particularly useful when the distance between the aircraft and the stabilization point S is higher than Dlim (aircraft outside the circle: limit trajectory not calculated); and
- a display of the limit heading instead of the limit trajectory. The concept is easily applied to the cases shown on FIGS. 4A and 5A, and it could be extended with some variations to the cases of FIGS. 4B and 5B. In this case, the limit trajectory is not displayed, and, instead, a symbol is displayed representing the heading beyond which the approach axis is likely to be intercepted in excess of energy (the distance being followed is too short), optionally accompanied by a particular symbol corresponding to the interception point between the limit trajectory calculated by the system and the approach axis.

Figures 6A, 6B, 6C:
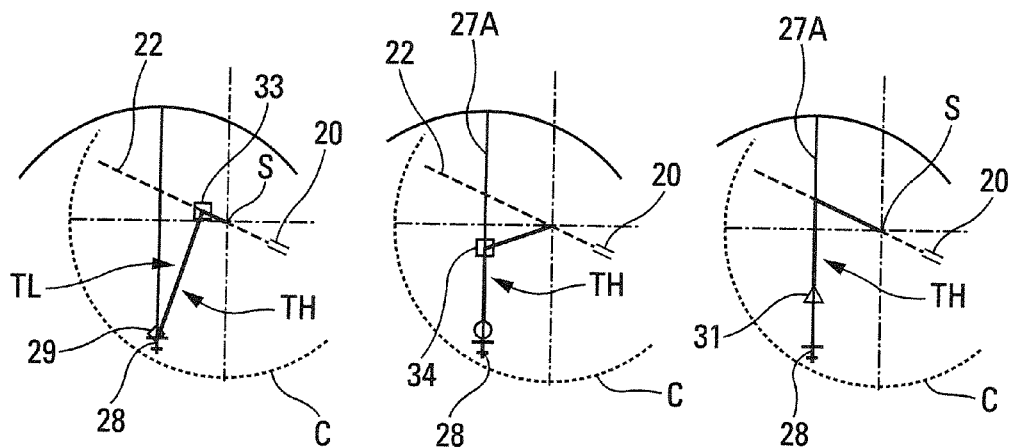
FIG. 6A is a diagram showing a first embodiment for building a horizontal trajectory using a first building rule when a Dlim distance is greater than the distance from the stabilization point (e.g., the aircraft is closer to the stabilization point than a limit distance).
FIG. 6B is a diagram showing a second embodiment for building a horizontal trajectory using a second building rule when a Dlim distance is greater than the distance from the stabilization point (e.g., the aircraft is closer to the stabilization point than a limit distance).
FIG. 6C is a diagram showing a third embodiment for building a horizontal trajectory using a third building rule when a Dlim distance is greater than the distance from the stabilization point (e.g., the aircraft is closer to the stabilization point than a limit distance).

In a preferred embodiment, said device 1 comprises a function being used when the aircraft A is located at a distance from the point S being lower than Dlim (thus inside the circle C centred on S and with a radius Dlim), as shown in the examples of FIGS. 6A to 6C.

In such a situation, for at least some types of trajectory, the limit point determining means 14 determines, on the horizontal trajectory TH, the position of an auxiliary limit point corresponding to a point before which (that is upstream of which) it is not recommended to subject the aircraft to a turn.

A first case corresponds to the hypothesis of a type of trajectory, wherein the aircraft A rotates immediately toward the approach axis 22, as shown on FIG. 6A. The function shows the auxiliary limit point (shown by a square 33) where the approach axis 22 should be intercepted so as to avoid an over-energy situation. In the example of this FIG. 6A, it is not, for instance, possible to intercept the approach axis 22 more to the right with respect with the position of the point 33, if the energy of the aircraft A is to be dissipated.

A second case corresponds to the hypothesis of a type of trajectory wherein the aircraft A holds its current heading (trajectory 27A) as long as possible before turning toward the stabilization point S, as shown on FIG. 6B. The auxiliary limit point (represented by a square 34) corresponds to the turn point the earliest toward the approach axis 22, if the energy of the aircraft A is to be dissipated.

A third case corresponds to the hypothesis of a type of trajectory wherein the aircraft A holds its current heading (trajectory 27A) as long as possible, until intercepting the approach axis 22, as shown on FIG. 6C. In such a case, it is not necessary to define an auxiliary limit point. Should it be defined, it would correspond to the intersection of the current path (trajectory 27A) of the aircraft A with the approach axis 22.

The invention claimed is:

1. A method for aiding the approach of an aircraft that has deviated from a flight plan including an approach axis, to enable an approach phase for the purpose of landing on a landing runway, the method comprising, automatically and repeatedly:
   (A) building, by a processing unit on the aircraft, a limit trajectory representing a flight trajectory of the aircraft being compatible with a performance of the aircraft upon the approach phase and which shows limits in which the aircraft can move around, the building of the limit trajectory comprising:
      (a) receiving, with the processing unit, a current speed vector of the aircraft and current position data, relative to the landing runway and to a stabilization point of the approach phase;
      (b) determining, by the processing unit, as a function of the performance of the aircraft and of the current speed vector, a vertical profile showing variation of height and of speed of the aircraft as a function of a distance, and the vertical profile configured to completely dissipate the energy of the aircraft upon the approach phase so that an energy state of the aircraft upon arrival at the stabilization point corresponds to a required energy state that is associated with the approach phase along the approach axis;
      (c) determining, by processing unit, a horizontal trajectory which is non-linear and thereby allows the aircraft to avoid obstacles and rejoin the flight plan to reach the stabilization point while also respecting the vertical profile determined, so as to ensure complete dissipation of the energy of the aircraft upon the approach phase; and
      (d) determining, by the processing unit, a position of a limit point on the horizontal trajectory, which represents engagement at the latest possible point of the approach phase while remaining within the limits set in the limit trajectory; and
   (B) displaying, by a viewing screen in a cockpit of the aircraft, the limit trajectory including at least the horizontal trajectory and the limit point, for review by a crew of the aircraft.

2. The method according to claim 1, wherein step (b) further comprises linking a current energy state of the aircraft to the required energy state at the stabilization point.

3. The method according to claim 1, wherein step (b) further comprises determining the vertical profile according to one building criterion selected from a plurality of predetermined building criteria stored in the processing unit.

4. The method according to claim 3, wherein the one building criteria selected for use in step (b) is chosen from a group consisting of:
   a first building criterion, wherein the stabilization point is directly linked to the current altitude in the vertical profile;
   a second building criterion, wherein a constant altitude level is provided in the vertical profile at the stabilization point; and
   a third building criterion, wherein a constant altitude level is provided in the vertical profile between the stabilization point and the current point.

5. The method according to claim 1, wherein the processing unit performs a prediction of the current speed vector of the aircraft.

6. The method according to claim 4, wherein step (c) further comprises determining the horizontal trajectory according to one building rule selected from a plurality of predetermined building rules stored in the processing unit.

7. The method according to claim 6, wherein the one building rule selected for use in step (c) is chosen from a group consisting of:
   a first building rule, whereby an immediate turn is carried out in the horizontal trajectory;
   a second building rule, whereby the current heading is held as long as possible in the horizontal trajectory while remaining within the limits set in the limit trajectory; and
   a third building rule, whereby the current heading is held in the horizontal trajectory until the approach axis is reached by the aircraft.

8. The method according to claim 1, further comprises determining, by the processing unit, an auxiliary limit point on the horizontal trajectory corresponding to a point before which it is not recommended to subject the aircraft to a turn.

9. A device for aiding the approach of an aircraft that has deviated from a flight plan including an approach axis, to enable an approach phase for the purpose of landing on a landing runway, said device comprising:
   a processing unit that automatically builds a limit trajectory representing a flight trajectory of the aircraft being compatible with a performance of said aircraft upon the approach phase and which shows limits in which the aircraft can move around, said processing unit performing the following operations to build the limit trajectory:
      receiving a current speed vector of the aircraft and current position data, relative to the landing runway and to a stabilization point of the approach phase;
      determining, as a function of the performance of the aircraft and of the current speed vector, a vertical profile showing variation of height and of speed of the aircraft as a function of a distance, and the vertical profile configured to completely dissipate the energy of the aircraft upon the approach phase so that an energy state of the aircraft upon arrival at the stabilization point corresponds to a required energy state that is associated with the approach phase along the approach axis;
      determining a horizontal trajectory which is non-linear and thereby allows the aircraft to avoid obstacles and rejoin the flight plan to reach the stabilization point while also respecting said vertical profile determined, so as to ensure complete dissipation of the energy of the aircraft upon the approach phase; and determining a position of a limit point on the horizontal trajectory, which represents engagement at the latest possible point of the approach phase while remaining within the limits set in the limit trajectory; and a displaying device including a viewing screen in a cockpit of the aircraft which is connected to the processing unit and automatically presents the limit trajectory including at least said horizontal trajectory and said limit point for review by a crew of the aircraft.

10. The device according to claim 9, wherein the display of the limit trajectory on said viewing screen is manually activated by an input transmitted to the processing unit.

11. The device according to claim 9, wherein the display of the limit trajectory on said viewing screen is automatically activated by an input transmitted to the processing unit.

12. The device according to claim 9, wherein the processing unit also performs the following operation:

determining, on the horizontal trajectory, a position of an auxiliary limit point on the horizontal trajectory corresponding to a point before which it is not recommended to subject the aircraft to a turn.

13. An aircraft, comprising a device for aiding the approach of the aircraft after deviation from a flight plan including an approach axis, to enable an approach phase for the purpose of landing on a landing runway, said device comprising:

a processing unit that automatically builds a limit trajectory representing a flight trajectory of the aircraft being compatible with a performance of said aircraft upon the approach phase and which shows limits in which the aircraft can move around, said processing unit performing the following operations to build the limit trajectory:

receiving a current speed vector of the aircraft and current position data, relative to the landing runway and to a stabilization point of the approach phase;

determining, as a function of the performance of the aircraft and of the current speed vector, a vertical profile showing variation of height and of speed of the aircraft as a function of a distance, and the vertical profile configured to completely dissipate the energy of the aircraft upon the approach phase so that an energy state of the aircraft upon arrival at the stabilization point corresponds to a required energy state that is associated with the approach phase along the approach axis;

determining a horizontal trajectory which is non-linear and thereby allows the aircraft to avoid obstacles and rejoin the flight plan to reach the stabilization point while also respecting said vertical profile determined, so as to ensure complete dissipation of the energy of the aircraft upon the approach phase; and determining a position of a limit point on the horizontal trajectory, which represents engagement at the latest possible point of the approach phase while remaining within the limits set in the limit trajectory; and a displaying device including a viewing screen in a cockpit of the aircraft which is connected to the processing unit and automatically presents the limit trajectory including at least said horizontal trajectory and said limit point for review by a crew of the aircraft.

14. The device according to claim 9, wherein said processing unit determines said vertical profile according to one building criterion selected from a group of predetermined building criteria stored in the processing unit, the group of predetermined building criteria consisting of:

a first building criterion, wherein the stabilization point is directly linked to the current altitude in the vertical profile;

a second building criterion, wherein a constant altitude level is provided in the vertical profile at the stabilization point; and a third building criterion, wherein a constant altitude level is provided in the vertical profile between the stabilization point and the current point.

15. The device according to claim 14, wherein said processing unit determines said horizontal trajectory according to one building rule selected from a group of predetermined building rules stored in the processing unit, the group of predetermined building rules consisting of:

a first building rule, whereby an immediate turn is carried out in the horizontal trajectory;

a second building rule, whereby the current heading is held as long as possible in the horizontal trajectory while remaining within the limits set in the limit trajectory; and a third building rule, whereby the current heading is held in the horizontal trajectory until the approach axis is reached by the aircraft.

\* \* \* \* \*